United States Patent
Couturier et al.

(10) Patent No.: US 12,313,037 B2
(45) Date of Patent: May 27, 2025

(54) CONTROLLING A WIND TURBINE WITH RESPECT TO DYNAMIC STABILITY

(71) Applicant: Siemens Gamesa Renewable Energy A/S, Brande (DK)

(72) Inventors: Philippe Couturier, Lafayette, CO (US); David Molitor, Longmont, CO (US); Dillon Volk, Hamburg (DE)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 18/277,890

(22) PCT Filed: Feb. 17, 2022

(86) PCT No.: PCT/EP2022/053911
§ 371 (c)(1),
(2) Date: Aug. 18, 2023

(87) PCT Pub. No.: WO2022/179926
PCT Pub. Date: Sep. 1, 2022

(65) Prior Publication Data
US 2024/0133362 A1 Apr. 25, 2024
US 2024/0229767 A9 Jul. 11, 2024

(30) Foreign Application Priority Data
Feb. 25, 2021 (EP) .................................. 21159195

(51) Int. Cl.
*F03D 7/02* (2006.01)

(52) U.S. Cl.
CPC ......... *F03D 7/0296* (2013.01); *F03D 7/0224* (2013.01); *F05B 2260/964* (2013.01); *F05B 2270/334* (2013.01)

(58) Field of Classification Search
CPC . F03D 7/0298; F03D 7/0296; F05B 2270/404
See application file for complete search history.

(56) References Cited

U.S. PATENT DOCUMENTS 7,692,322 B2 * 4/2010 Wakasa ...................... F03D 9/25
290/55
9,624,906 B2 * 4/2017 Pineda Amo ........... F03D 13/22
(Continued)

FOREIGN PATENT DOCUMENTS

EP 2084400 8/2009
EP 2791502 A1 10/2014
(Continued)

OTHER PUBLICATIONS

PCT International Preliminary Report on Patentability mailed Jun. 9, 2023 corresponding to PCT International Application No. PCT/EP2022!053911 filed Feb. 17, 2022.
(Continued)

*Primary Examiner* — Justin D Seabe
(74) *Attorney, Agent, or Firm* — Schmeiser, Olsen & Watts LLP

(57) ABSTRACT

A method of controlling a wind turbine having a tower and a rotor at which plural rotor blades are mounted includes: determining, in particular in real time, a damping characteristic of at least one vibration mode related to the wind turbine; and controlling the wind turbine based on damping characteristic.

17 Claims, 3 Drawing Sheets

(56) References Cited

U.S. PATENT DOCUMENTS

| | | | |
|---|---|---|---|
| 9,909,562 B2* | 3/2018 | Baek | F03D 7/043 |
| 10,145,360 B2* | 12/2018 | Kramer | F03D 7/0296 |
| 10,294,923 B2* | 5/2019 | Kristoffersen | F03D 7/046 |
| 10,415,548 B2* | 9/2019 | Caponetti | F03D 9/25 |
| 11,041,480 B2* | 6/2021 | Miranda | F03D 7/0272 |
| 11,261,844 B2* | 3/2022 | Hotimsky | F03D 7/0224 |
| 2011/0182730 A1 | 7/2011 | Link | |
| 2012/0139740 A1 | 6/2012 | Drossel et al. | |
| 2012/0200087 A1 | 8/2012 | Schindele et al. | |
| 2015/0252779 A1 | 9/2015 | Sievers et al. | |
| 2018/0245568 A1* | 8/2018 | Pedersen | F03D 7/0244 |

FOREIGN PATENT DOCUMENTS

| | | |
|---|---|---|
| EP | 3055557 B1 | 8/2016 |
| EP | 3702613 A1 | 9/2020 |

OTHER PUBLICATIONS

Mendez et al., An application of HODMD to predict flutter using NeoCASS, 8th European Conference for Aeronautics and Aerospace Sciences (EUCASS); 2019, 8 pages.

Sinske et al., Flight Testing Using Fast Online Aeroelastic Identification Techniques With DLR Research Aircraft Halo, https://www.researchgate.net/publication/320033893.; 2017, International Forum on Aeroelasticity and Structural Dynamics IFASD 2017, Jun. 25-28, 2017, Como—Italy, 20 pages.

Govers et al., Wind Tunnel Flutter Testing on a Highly Flexible Wing for Aeroelastic Validation in the Transonic Regime Within the Hmaei Project, International Forum on Aeroelasticity and Structural Dynamics IFASD; 2019, Jun. 9-13, 2019, Savannah, Georgia, USA, 25 pages.

Jelicic et al.; Online Monitoring of Aircraft Modal Parameters during Flight Test based on permanent Output-Only Modal Analysis; (2017) 10.2514/6.2017-1825.

Mendez, et al.; Aeroelastic flutter flight test data analysis using a high order dynamic mode decomposition approach; 10.2514/6.2019-1531; 2019.

* cited by examiner

CONTROLLING A WIND TURBINE WITH RESPECT TO DYNAMIC STABILITY

CROSS-REFERENCE TO RELATED APPLICATIONS

This application claims priority to PCT Application No. PCT/EP2022/053911, having a filing date of Feb. 17, 2022, which claims priority to EP Application No. 21159195.3, having a filing date of Feb. 25, 2023, the entire contents both of which are hereby incorporated by reference.

FIELD OF TECHNOLOGY

The following relates to a method and to an arrangement of controlling a wind turbine (e.g. having a tower and) having a rotor on which plural rotor blades are mounted and further relates to a wind turbine including the arrangement.

BACKGROUND

During operation of a wind turbine, vibrations or oscillations of one or more components of the wind turbine may occur. These oscillations may affect integrity of the components and/or lifetime of the components.

Avoiding unstable turbine conditions is currently handled by tailoring the blade shape and structure to ensure enough system damping is present in the critical modes. However, the high uncertainty of dynamic instabilities requires extra safety margin which translates to additional blade reinforcement and cost.

The documents US 20110182730A1 and US 20150252779 A1 attempt to address the general instability and vibration issues by introducing additional damping elements to help minimize displacement amplitudes. Likewise, vibration reduction control schemes have been proposed that use indirect measurements. These schemes track edgewise oscillations and operational loads, see e.g. Pat No. EP 2 084 400 B1, EP 3 055 557 B1.

It is important to note that these methods are purely reactive, i.e. can only react once an instability has started to put a significant amount of energy into the turbine modes. Furthermore, they can do nothing before the region of negative damping has been reached. Thus, there may be a need for a method and a corresponding arrangement of controlling a wind turbine such that oscillations or vibrations of at least one component of the wind turbine is reduced and in that damage of the component is prohibited and/or lifetime of the component is increased.

SUMMARY

According to an embodiment of the present invention it is provided a method of controlling a wind turbine (in particular having a tower and) having a rotor at which plural rotor blades are mounted, the method comprising: determining, in particular in real time, at least one damping characteristic of at least one vibration mode related to the wind turbine; and controlling the wind turbine based on damping characteristic.

Embodiment of the present invention may be applied to a vertical rotor axis wind turbine or a horizontal rotor axis wind turbine. A tower does not need to be present.

The method may be implemented in software and/or hardware. The method may for example be performed by a wind turbine controller or a module of a wind turbine controller. The wind turbine may comprise a nacelle mounted on top of the tower, wherein the nacelle harbours the rotor at which the plural rotor blades are mounted. The blade rotor may be coupled to a rotor of a generator which produces electric energy upon rotation of the rotor.

The vibration mode related to the wind turbine may comprise a vibration or oscillation of at least one component or substructure of the wind turbine and/or a vibration or an oscillation of the entire wind turbine. The vibration mode may define a vibration/oscillation, i.e. a reciprocating movement, which occurs or evolves in a periodic manner. The vibration or oscillation may be characterized by a vibration frequency and a vibration magnitude and/or direction.

The damping characteristic of the vibration mode may indicate the evolvement or the decay or rate of change of the vibration magnitude with time. The damping may be associated or define the aeroelastic damping of the one or more components. The damping characteristic may reflect or correspond to the actual damping characteristic occurring at the actual point in time when the wind turbine is operating.

The aeroelastic damping may be due to the material used to manufacture the considered oscillating component as well as be related to aerodynamic environmental conditions. The aeroelastic damping may also depend on the structural shape of the component under consideration, for example a shape of a rotor blade. The one or more vibration modes may also be depending on a material, a geometric shape and elastic properties of the component under consideration.

Determining the damping characteristic may involve performing at least two measurements using one or more measurement sensors which may be installed at or close to the one or more components under consideration. The method may in parallel be applied to plural vibration modes for example related to plural components of the wind turbine. Each component may be associated with a number or plural vibration modes, with respect to different kinds of movements of the components or portions of the components relative to other portions of the components or to other components. Determining the damping characteristic may involve performing measurements as well as processing measurement values. In particular, one or more turbine vibration modes may be considered in embodiments of the present invention.

Controlling the wind turbine may comprise to send control signals to one or more actuators comprised in the wind turbine. Controlling the wind turbine may comprise to change an operational state of the wind turbine such as to effect lowering a vibration magnitude associated with the considered vibration mode. Controlling the wind turbine may be dispensed with, if the damping characteristic indicates sufficient damping of the considered vibration mode. In contrast, when the damping characteristic indicates that only a low damping or even a negative damping pertains, the wind turbine may be controlled such that the damping is increased, leading to reducing vibration magnitudes.

According to an embodiment of the present invention, the damping characteristic may have been previously determined in offline experimental studies for plural operational states and plural environmental conditions the wind turbine is subjected to. In other embodiments of the present invention, the damping characteristic is determined in real-time, i.e. while the wind turbine is in operation, in particular producing electric energy and supplying the electric energy to a utility grid.

The damping characteristic may be different for different operational states of the wind turbine and may also be different for different environmental conditions of the wind turbine. The operational state of the wind turbine may be defined based on plural measurements of operational parameter values and the environmental condition may be defined by plural measurements of environmental parameters like wind speed, wind turbulence, temperature and so forth. After determining the damping characteristic, the damping characteristic may be stored in an electronic storage associated with for example the particular associated operational state and/or the actual environmental condition.

Controlling the wind turbine may keep the damping characteristic in a favourable regime and/or change the damping characteristic into a more favourable regime in which the amplitude of the vibration mode becomes reduced compared to the previous setting of the operational state. Thereby, the vibration or oscillation may be reduced, damage of components may be reduced and lifetime of the components may be prolonged.

According to an embodiment of the present invention, determining the, in particular aeroelastic, damping characteristic depends on an operational state of wind turbine, in particular defined by environmental and/or internal operation parameters, and/or wherein the control is such that at least one adverse vibration or oscillation is reduced.

The operational state of the wind turbine may for example be defined by one or more of: a rotational speed of the rotor, a blade pitch angle, a yaw angle, one or more reference values which are supplied to a converter and/or to a generator of the wind turbine, a state of an airflow influencing device which may optionally be mounted or provided at one or more of the rotor blades, by active power output of the wind turbine, by reactive power output of the wind turbine, by a torque of the generator and/or other operational parameters values, for example. The internal operational parameters may be operational parameters which are internal to the wind turbine without the environmental parameters.

The environmental condition may for example be defined by wind speed, wind turbulence, temperature, humidity and other values.

The control may target one or more specific vibrations or oscillations or vibration modes which are expected or known to be especially adverse or damaging. In particular, vibration or oscillations which may naturally be excited during normal operation may be addressed according to embodiments of the present invention. Thereby, the method may be simplified when theoretically possible vibration or oscillations which however are not expected to be excited during normal operations are not primarily or not at all addressed or considered or accounted for. When the damping characteristic is determined in a dynamic manner depending on the operational state, it may be possible to more efficiently counteract vibrations or oscillations, in particular faster than conventionally known.

According to an embodiment of the present invention, determining the damping characteristic comprises determining a, in particular aeroelastic, damping level.

The vibration magnitude related quantity may relate to an amplitude to the vibration or oscillation of the considered vibration mode. The vibration magnitude related quantity may for example be the amplitude of the vibration or oscillation itself or may be a quantity which may relatively easy be measurable and from which the vibration magnitude may be derived from or at least estimated. For example, the vibration magnitude related quantity may comprise a strain value or an acceleration value of a portion of the component under consideration relative to another portion of the component or relative to another component. The vibration magnitude related quantity may for example comprise a blade root strain which may be conventionally measured by one or more strain sensors arranged close to or at the root section of the rotor blade. The vibration magnitude related quantity may also in other embodiments comprise an optically measurable value.

The damping level may correspond or may be equal to a relative change of the vibration magnitude related quantity with time, for example expressed as a logarithmic decrement of the vibration magnitude or the vibration magnitude related quantity. The damping level may indicate how the vibration magnitude of the vibration or oscillation under consideration will evolve in the future. Thus, taking into account the damping level may advantageously enable to control the wind turbine such that an excessively high vibration magnitude is avoided.

Embodiments of the present invention may or may not also include the vibration magnitude as such or the vibration magnitude related quantity itself. The control of the wind turbine may for example be initiated while the vibration magnitude or the vibration magnitude related quantity is still within an acceptable limit or threshold, while however the damping level (and/or temporal change of the damping level) indicates a relatively low damping or even negative damping such that an excessively high vibration magnitude is expected for the near future.

Embodiments of the present invention may alternatively or additionally consider/calculate a temporal change of the damping level and react when e.g. the temporal change of the damping level is too fast in the direction of decreasing damping level. E.g. if the temporal change of the damping level is below a (e.g. negative) damping change threshold, a control action may be triggered or performed. Thereby derivative control may be performed.

Embodiments of the present invention may react based on large changes in aeroelastic damping as well as the absolute value of aeroelastic damping.

Conventional methods may not have reacted or responded to this scenario. Thus, avoiding excessively high vibration magnitudes may in an improved manner be achieved in embodiments of the present invention.

According to an embodiment of the present invention, determining the damping level comprises:
measuring a first value of the vibration magnitude related quantity at a first point in time;
measuring a second value of the vibration magnitude related quantity at a second point in time;
calculating the damping level from at least the first value and the second value of the vibration magnitude.

Measuring may involve acquiring raw data, including e.g. sampling, and may involve data processing, such as decomposition in different vibration modes and/or extracting one or more modes of interest.

Embodiments of the present invention may decompose a vibration signal, thereby obtaining vibration amplitude for each mode.

Determining the damping level may comprise to measure plural values of the vibration magnitude related quantity at plural different points in time. Calculating the damping level may involve to compute one or more changes or differences between successively acquired values of the vibration magnitude or of the vibration magnitude related quantity. Thereby, conventionally known methodologies for determining a damping level may be supported, simplifying the implementation.

The following definition of damping may apply:
The total damping of a system or subcomponent is a measure of its rate of energy dissipation often measured in % critical damping or % logarithmic decrement. As such, it can only be measured indirectly, i.e. it can only be quantified by measuring another quantity. Once a system is excited with some input, such as turbulence or a forced pitch motion, the system will then respond. This response will depend on the sign of the system damping:

i. Negative damping: The system will amplify the vibration amplitude. This can lead to dangerous load levels and should be avoided.
 ii. Positive damping: The vibrations from the initial input will decay over time and the system will stabilize.
 iii. 0 (zero) damping: At exactly zero damping the system will oscillate at a fixed amplitude forever.

According to an embodiment of the present invention, the vibration magnitude related quantity includes at least one of: a blade strain, in particular blade root strain; a tower top strain, an acceleration of at least one substructure, a deformation.

The blade strain or the tower strain may be measured by one or more strain sensors. The acceleration of a portion of a substructure relative to a portion of this substructure or another substructure may be measured by one or more accelerometers. The deformation of the substructure or one or more substructures may be measured by one or more optical measurements and/or acceleration measurements and/or strain measurements. In other embodiments, the motion of the component under consideration may be monitored regarding its amplitude by for example optical and/or electrical measurements. Thereby, conventionally known measurement techniques may be supported.

According to an embodiment of the present invention, the method further comprises allowing the vibration mode to become excited or actively exciting the vibration mode; considering measured values of the vibration magnitude related quantity after the excitation, in order to determine the damping level.

The method may involve to monitor when (at which point in time) the excitation has occurred and may then acquire measurement values. Only measurement values acquired after the excitation has been completed may be considered for determining the damping characteristic and in particular the damping level. The method may continuously or regularly determine the damping characteristic in a dynamic manner from plural measurement values which are respectively acquired after respective excitations have been performed.

Allowing the vibration mode to become excited may utilize external disturbances the wind turbine is subjected to, for example including wind turbulence. For these embodiments, no particular excitation equipment may be necessary and also actuation of the excitation equipment may not be necessary.

Other embodiments alternatively or additionally may employ some kind of excitation equipment which is provided or mounted at one or more components of the wind turbines whose vibrations or oscillations are to be considered in methods according to embodiments of the present invention. Acquiring measurement values and determining the damping level may only be performed after excitation has been initiated or completed.

According to an embodiment of the present invention, exciting the vibration mode comprises at least one of: reciprocating and/or rotating and/or moving a blade mounted mass; reciprocating and/or rotating and/or moving a tower and/or nacelle mounted mass; actuating a blade mounted aerodynamic device, in particular a flutter vane and/or winglet and/or flap; actuating a blade pitch system; generating a generator torque, in particular pulsed; generating a yaw change, in particular yaw pulse; and/or wherein allowing the vibration mode to become excited comprises: allowing a wind turbulence to excite the vibration mode; detecting that excitation occurred.

The blade mounted aerodynamic device may comprise at least one aerodynamic surface which may be movable relative to profiles of the blade, in order to change for example an aerodynamic coefficient or intentionally cause stall at one or more sub-regions or sub-areas of the rotor blade external surface. The reciprocating and/or rotating blade mounted mass may be actuated to move according to the frequency which is associated with the vibration mode under consideration. The blade pitch system may for example be actuated to cause at least one sudden change of the blade pitch angle leading to a sudden change of a lifting coefficient and thereby causing excitation of the vibration or oscillation. The wind turbulence may be measured for example as based on wind speed changes. When the wind turbulence exceeds a particular turbulence threshold, it may be inferred or concluded that an excitation occurred naturally, i.e. by external influence.

According to an embodiment of the present invention, controlling the wind turbine is performed in a direction to increase the damping level, in particular, if the determined damping level is lower than a damping threshold and/or a vibration amplitude is greater than an amplitude threshold.

The method may be directed in order to keep the damping level of all potentially deteriorating vibrations or oscillations above a predefined or one or more predefined damping thresholds. Controlling the wind turbine may even be performed, if the damping level is lower than a damping threshold (and/or if temporal change of the damping level is below a damping change threshold, e.g. if damping value is changing too fast) but the vibration amplitude is still smaller than the amplitude threshold. This may be different from conventionally known methods.

According to an embodiment of the present invention, the method further comprises using the determined damping level to predict vibration magnitude in the future; controlling the wind turbine based on the predicted vibration magnitude.

The damping level considered as a rate change of the vibration magnitude may advantageously be used to determine or predict the vibration magnitude in a future time interval. Conventional methods may not have been determined a predicted vibration magnitude but may have only utilized a measured vibration magnitude. Thus, conventional methods may have reacted too late or later than embodiments of the present invention to apply measures to reduce the vibration magnitude.

According to an embodiment of the present invention, determining the damping characteristic at least partly employs system identification and/or operational modal analysis, in order to dynamically determine frequency values and damping values of plural vibration modes. Thereby, conventionally known techniques may be employed, simplifying the implementation.

According to an embodiment of the present invention, the vibration mode is associated with at least one vibration mode of a substructure of the wind turbine, the substructure including at least one of: the rotor; a drive train; at least one rotor blade. Thereby, conventionally observed vibration modes may be addressed in embodiments of the present invention.

According to an embodiment of the present invention, controlling the wind turbine includes at least one of changing a blade pitch angle; changing a setting of air flow regulating device mounted on or exposed at the blade;

changing a rotor speed; changing a generator torque; changing yaw angle, changing at least one converter references of a converter coupled to a generator which is driven by the rotating rotor.

Controlling the wind turbine may involve to send one or more control signals to one or more actuators and/or the generator and/or one or more converters. Thereby, conventionally utilized operational parameters may be changed in embodiments of the present invention.

According to an embodiment of the present invention, the method includes requesting a damping measurement; exciting a wind turbine substructure; performing substructure strain measurements; performing system identification; determining at least one system damping level; changing operation state, if system damping level indicates unstable behaviour. Thereby, a possible flow structure is provided which may in a simple manner be implemented.

It should be understood, that features, individually or in any combination, disclosed, described, explained or provided for a method of controlling a wind turbine may, individually or in any combination, also be applied or provided for an arrangement for controlling a wind turbine according to embodiments of the present invention and vice versa.

According to an embodiment of the present invention it is provided an arrangement for controlling a wind turbine having a tower and a rotor at which plural rotor blades are mounted, the arrangement being configured to determine, in particular in real time, at least one damping characteristic of at least one vibration mode related to the wind turbine; and to control the wind turbine based on damping characteristic.

The arrangement may be a part or portion of a wind turbine controller. The arrangement may communicatively be coupled to one or more actuators, to the generator and/or to the converter.

According to an embodiment it is provided a wind turbine, comprising: a tower; a rotor at which plural rotor blades are mounted; a generator coupled to the rotor; and an arrangement according to the preceding embodiment, coupled for controlling at least one wind turbine component.

The aspects defined above and further aspects of embodiments of the present invention are apparent from the examples of embodiment to be described hereinafter and are explained with reference to the examples of embodiment. Embodiments of the invention will be described in more detail hereinafter with reference to examples of embodiment but to which the invention is not limited.

BRIEF DESCRIPTION

Some of the embodiments will be described in detail, with reference to the following figures, wherein like designations denote like members, wherein:

FIG. 1 schematically illustrates a wind turbine according to an embodiment of the present invention;

FIG. 2 schematically illustrates a method scheme according to an embodiment of the present invention;

DETAILED DESCRIPTION

Figure 1:
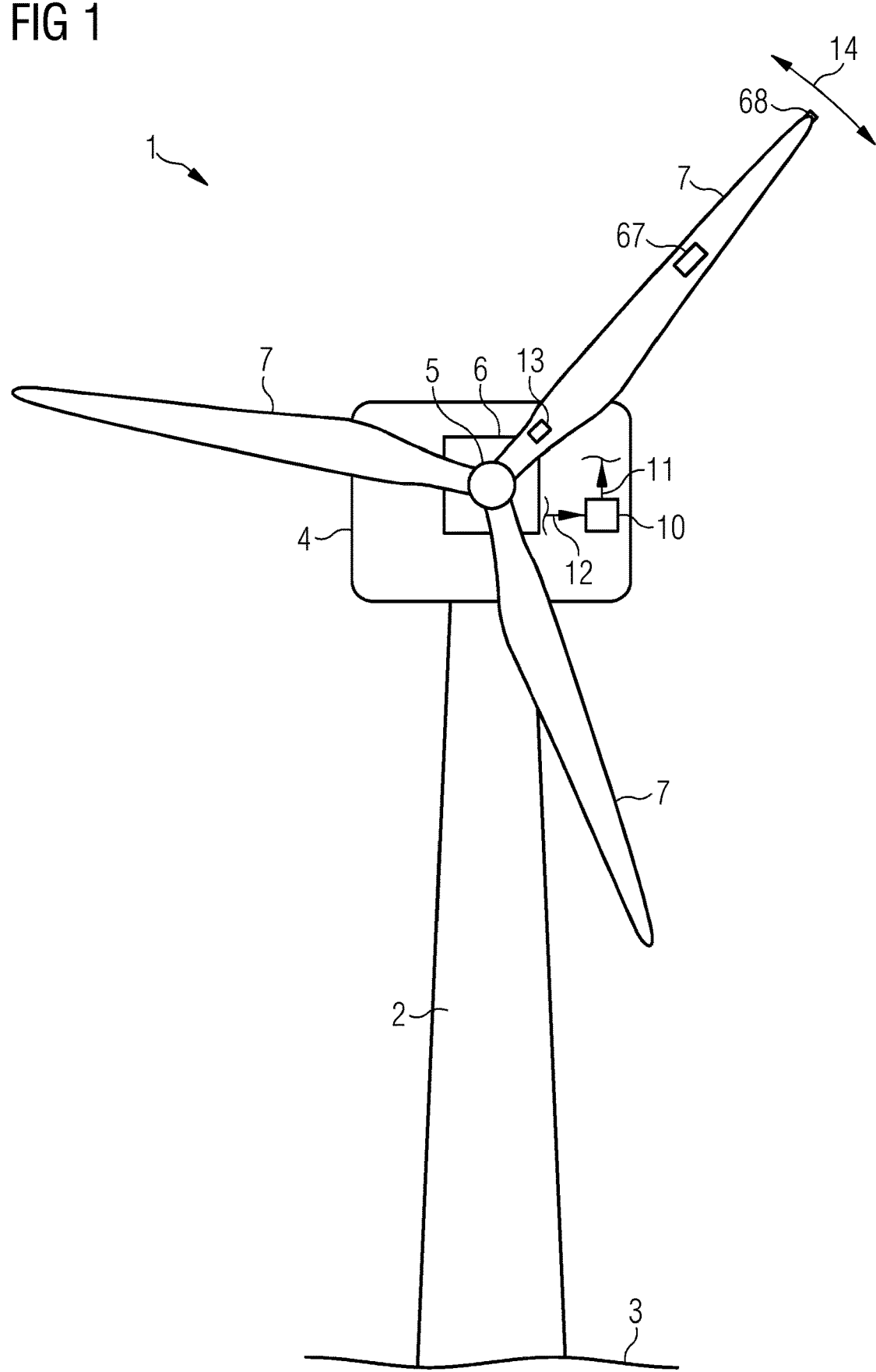

The illustration in the drawings is in schematic form. It is noted that in different figures, elements similar or identical in structure and/or function are provided with the same reference signs or with reference signs, which differ only within the first digit. A description of an element not described in one embodiment may be taken from a description of this element with respect to another embodiment.

The wind turbine 1 schematically illustrated in FIG. 1 according to an embodiment of the present invention comprises a tower 2 which is erected at a ground 3. On top of the tower, a nacelle 4 is mounted. The nacelle 4 comprises a rotor 5 and a generator 6 which is driven by the rotating rotor 5. The wind turbine 1 further comprises plural wind turbine blades 7 which are mounted at the rotor 5.

The wind turbine 1 further comprises an arrangement 10 for controlling the wind turbine 1 with respect in particular for avoiding excessive vibration or oscillation of one or more components. The arrangement 10 is configured to determine in real-time at least one damping characteristic of at least one vibration mode related to the wind turbine. In particular, the arrangement 10 is configured to determine a characteristic of at least one mechanical vibration mode 14 of one of the wind turbine blades 7. Furthermore, the arrangement 10 is configured to control the wind turbine based on the damping characteristic.

For this purpose, the arrangement 10 outputs control signals 11 which are supplied to an actuator or for example the generator 6 or a not illustrated converter which is electrically coupled to the generator 6, in order to change an operational state of the wind turbine. The arrangement 10 receives, for determining the damping characteristic, measurement signals 12 from one or more sensors which are configured to measure a vibration magnitude related quantity 12. Therefore, the wind turbine blade comprises a blade root strain sensor 13 which measures the strain at the blade root of the rotor blade 7. The strain measured by the strain sensor 13 reflects or indicates a vibration magnitude for example of a vibration or oscillation indicated with a double arrow having the reference sign 14. The vibration or oscillation 14 may for example comprise or be a side-side oscillation or a fore-aft oscillation, in particular an edgewise oscillation or an edge mode or a forward mode or a flap motion or a combination of the aforementioned vibration modes. The arrangement 10 is configured to carry out a method of controlling a wind turbine according to an embodiment of the present invention.

In the embodiment illustrated in FIG. 1, the rotor blade 7 comprises a blade mounted exciter equipment 67 which may for example be configured as an airflow regulating device, such as a spoiler, a vortex generator or a movable or rotatable mass. Additionally or alternatively, the blade comprises a flutter vane 68 which may be moved on demand for exciting the vibration or oscillation of the rotor blade 7, for example as depicted by the double arrow 14. The arrangement 10 may perform system identification and/or operational modal analysis for deriving the damping levels and/or controlling the wind turbine.

The strain measurement signals 12 received by the arrangement 10 may represent a vibration magnitude related quantity which is evaluated for different points in time in order to determine the damping levels.

Figure 2:
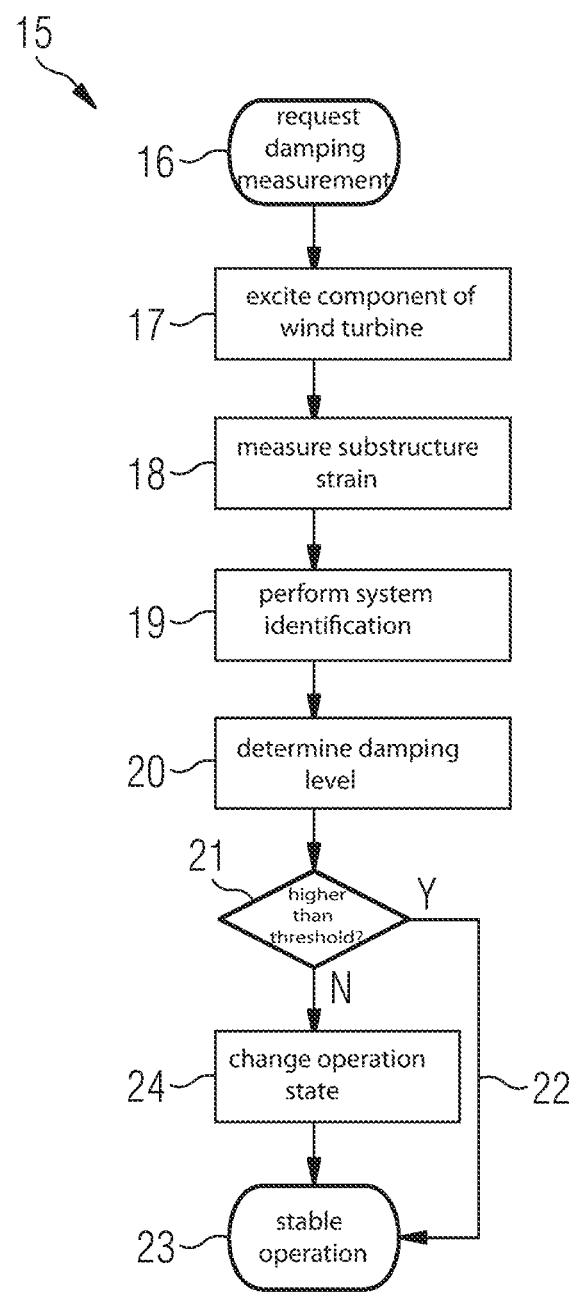

FIG. 2 illustrates an example of a method 15 of controlling the wind turbine, such as wind turbine 1 illustrated in FIG. 1, which may be performed by the arrangement 10 illustrated in FIG. 1. In a method step 16, a damping measurement is requested. In a further method step 17, a component of the wind turbine, for example a blade, is excited, for example using a shaker, a flutter vane, a wind turbulence or the like. In a further step 18, the substructure strain measurement is performed, for example using the strain sensor 13 illustrated in FIG. 1. In a further method step 19, a system identification step is performed, wherein for example the arrangement 10 applies a system identification model.

In a step 20, one or more system damping levels are determined using the system identification step and the substructure strain measurements from steps 18 and 19. In a decision block 21 it is assessed whether the damping level is higher or lower than a threshold level and/or if temporal change, in particular decrease, of the damping level is above or below a threshold, thereby providing derivative control. If the damping level is higher than the threshold level, it is switched to branch 22 leading to the method step 23 indicating a stable operation of the wind turbine.

If however the assessment in assessment block 21 results in the determination that the damping level is not greater than the damping threshold, it is switched to the method block 24, in which the operational state of the wind turbine is changed.

The steps 16, 17, 18, 19, 20 illustrated in FIG. 2 of the exemplary method 10 may be considered as a particular implementation of a method step of determining a damping characteristic of at least one vibration mode related to a wind turbine. The method steps 20, 21, 24 of the method 15 illustrated in FIG. 2 may be considered as a particular implementation of a controlling step wherein the wind turbine is controlled based on the damping characteristic.

Figure 3:
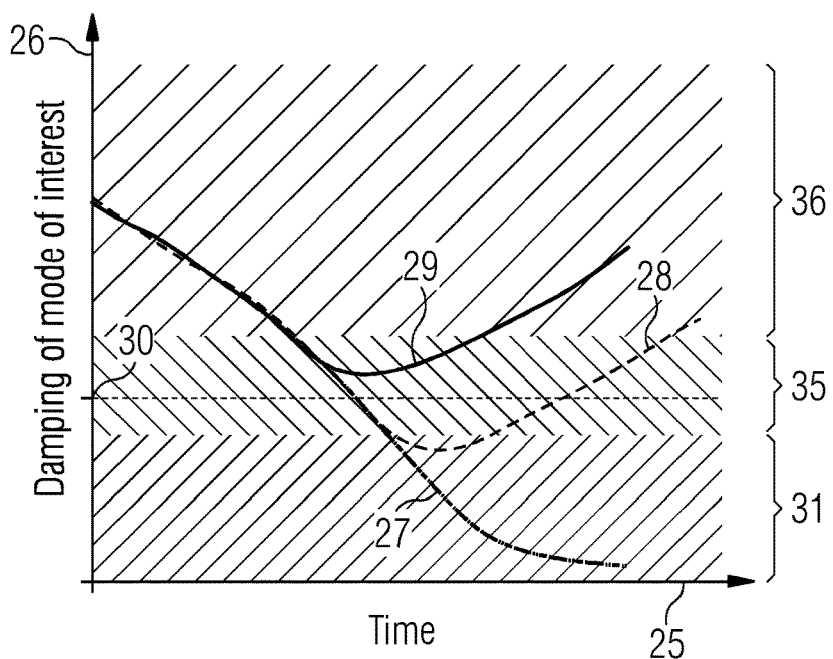
FIG. 3 illustrates a performance of methods according to embodiments of the present invention in comparison to the prior art.

FIG. 3 indicates in a coordinate system having an abscissa 25 indicating time and having an ordinate 26 indicating the damping level, a time course of damping levels as observed in the prior art curve 27, in the prior art curve 28 and in the curve 29 indicating the time course of the damping as achieved in embodiments of the present invention. For the unmonitored case of the prior art curve 27, the damping reaches very soon relatively low values which are below a damping threshold 30 which may be defined according to embodiments of the present invention. Similarly, the prior art curve 28 also depicts damping levels which are below the threshold 30.

The responses of the different methods may also be seen in a time-history type visualization as shown in FIG. 3. The unmonitored behaviour (curve 27 is a conventional turbine strategy where if the system were to go unstable, the undamped vibrations can grow until catastrophe. If only vibration amplitude is monitored, then the system must go unstable. This behaviour is observed in FIG. 3 where line 28 still dips into the undamped region and only then can it come back to stable. The proposed solution (curve 29 can determine when damping is low and "steer" the Wind Turbine Generator (WTG) operating state back to the safe region without ever going unstable. The damping timeseries corresponding to each behaviour is displayed in FIG. 3. The unmonitored behaviour (curves 27) grows out of control. The vibration or oscillation avoidance behaviour (curves 28) must rise to an unsafe amplitude, and only then may it be corrected and brought back to stable. Embodiments of the proposed invention's behaviour (curves 29) never goes unstable in operation.

The region 31 in FIG. 3 indicates an undamped region in which for example the vibration magnitude may increase with time.

The prior art curve 28 illustrated in FIG. 3 may base the control of the wind turbine on the value of the load or the value of the vibration magnitude. For this curve 28, the damping levels partly lie within the undamped region 31 involving increase of the vibration magnitude. Thereby, conventionally, risk of damage of components is involved. To a great extent, however, the prior art curve 28 resides in a low damping region 35.

The damping curve 29 as achieved in embodiments of the present invention exhibits damping values which are higher than the damping threshold 30. The curve 29 entirely lies in a safe damping region 36. Thereby, excessive vibration magnitudes of any components of the wind turbine are avoided.

The main issue of embodiments of this invention may seek to address is to avoid life-shortening blade vibrations which occur when a turbine's aeroelastic vibration modes become negatively damped and unstable, e.g. standstill vibrations and flutter. A mode, which may also be referred to as a mode of motion, may be a pattern of oscillation or vibration or other regular repetition of movement. Operating for an extended period in low or negatively damped situations results in high extreme and fatigue loads.

Figure 4:
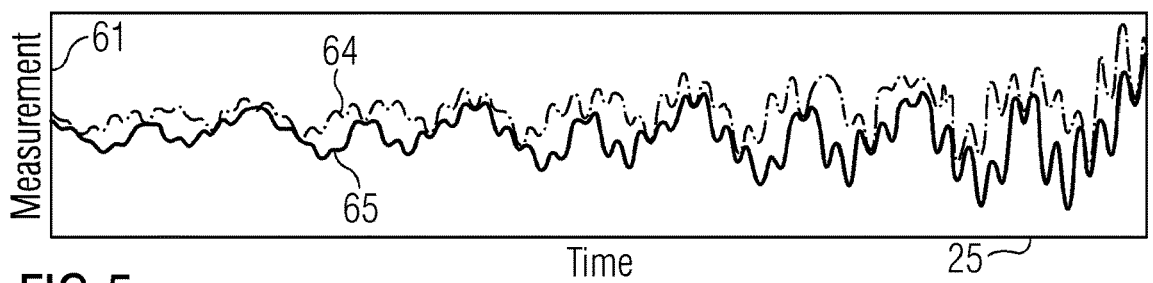
FIG. 4 illustrates a performance of methods according to embodiments of the present invention in comparison to the prior art.
Figure 5:
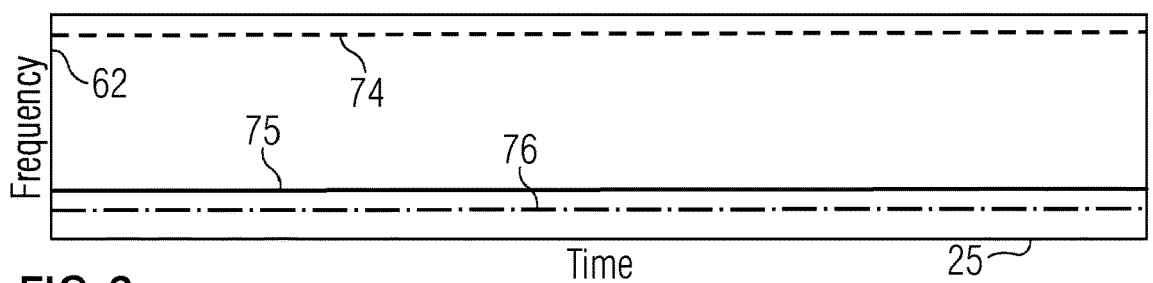
FIG. 5 illustrates a performance of methods according to embodiments of the present invention in comparison to the prior art.
Figure 6:
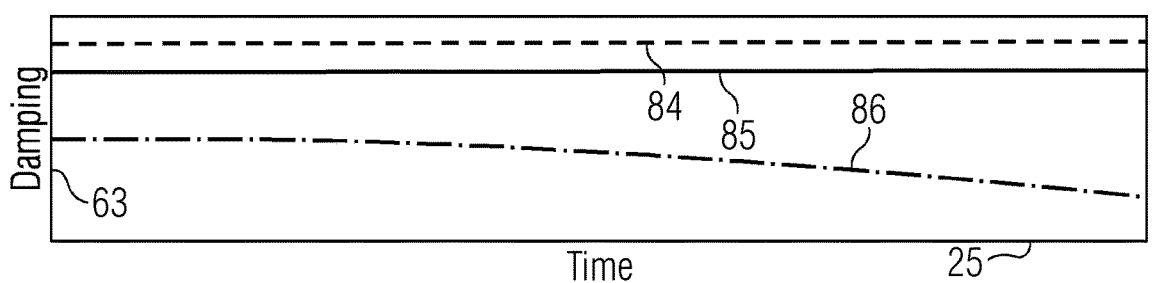
FIG. 6 illustrates steps of determining damping levels according to embodiments of the present invention.

FIGS. 4, 5 and 6 indicate curves in coordinate systems having as an abscissa 25 the time and having as ordinates 61 the vibration or oscillation signal, as an ordinate 62 the frequency and as an ordinate 63 the logarithmic decrement in percent. The vibration or oscillation curves 64 and 65 of FIG. 4 are processed by the arrangement 10 to result in the corresponding frequencies 74, 75, 76 as depicted in FIG. 5. Furthermore, by further processing the vibration or oscillation signals 64 and 65 depicted in FIG. 4, also the corresponding damping values 84, 85, 86 are derived according to embodiments of the present invention. The method to calculate the damping from the original vibration or oscillation signals 64 and 65 could be done using a signal processing approach such as system identification.

As can be appreciated from FIG. 4, the vibration or oscillation signals 64 and 65 are measured for plural points in time along the abscissa 25 indicating the time. The damping levels 84, 85, 86 in FIG. 6 are each calculated by considering at least two values of the vibration magnitude at two different points in time.

Using system identification may enable to construct a model of the system within a controller without any knowledge of the system except for the outputs, such as measurement regarding e.g. strain, vibration magnitude, etc. In this context, system identification is the ability for the WTG controller to create a dynamic model of the WTG using only measurement data.

System identification is being referred to as a grouping of signal processing methods used to extract dynamic system properties. In these methods the identified model breaks the system response down into components of orthonormal modes that have their own frequency and damping components. System identification is also closely related to and sometimes used for operational modal analysis, where the modal properties of a structure are estimated from vibration data collected during operation. The terms system identification, SI and operational modal analysis, OMA are sometimes used interchangeably. The output of such methods is frequency and damping values for a number of vibratory modes that varies with time.

An example of the application of system identification to turbine simulation is shown in FIGS. 4, 5 and 6. The FIG. 4 shows blade root strains vs. time. The frequencies of the extracted modes, and their damping values vs. time are then shown in FIGS. 5 and 6, respectively.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of controlling a wind turbine having a tower and a rotor at which a plurality of rotor blades are mounted, the method comprising:
   determining, in real time, at least one damping characteristic of at least one vibration mode related to the wind turbine; and
   controlling the wind turbine based on the damping characteristic,
   wherein determining the damping characteristic comprises determining a damping level calculated to depend on a relative change of a vibration magnitude related quantity with time;
   wherein a time course of the damping level never falls below a damping threshold where undamped vibrations occur.

2. The method according to claim 1, wherein determining the damping characteristic depends on an operational state of wind turbine defined by environmental and/or internal operation parameters, and/or
   wherein the control is such that at least one adverse oscillation is reduced.

3. The method according to claim 1, wherein determining the damping level comprises:
   measuring a first value of the vibration magnitude related quantity at a first point in time;
   measuring a second value of the vibration magnitude related quantity at a second point in time;
   calculating the damping level from at least the first value and the second value of the vibration magnitude related quantity.

4. The method according to claim 1, wherein the vibration magnitude related quantity includes at least one of:
   a blade strain;
   a tower top strain,
   an acceleration of at least one substructure, or
   a deformation,
   wherein the vibration magnitude related quantity is measured by at least one of:
   a fibre Bragg grating to measure strain tower/blade, or
   one or more optical camera measurements.

5. The method according to claim 1, further comprising:
   allowing the vibration mode to become excited or actively exciting the vibration mode;
   considering measured values of the vibration magnitude related quantity after the excitation, in order to determine the damping level.

6. The method according to claim 1,
   wherein exciting the vibration mode comprises at least one of:
   reciprocating and/or rotating and/or moving a blade mounted mass;
   reciprocating and/or rotating and/or moving a tower mounted mass;
   actuating a blade mounted aerodynamic device, the blade mounted aerodynamic device being a flutter vane and/or winglet and/or flap;
   actuating a blade pitch system;
   generating a generator torque, in particular pulsed;
   generating a yaw change, in particular yaw pulse;
   and/or
   wherein allowing the vibration mode to become excited comprises:
   allowing a wind turbulence to excite the vibration mode;
   detecting that excitation occurred.

7. The method according to claim 1, wherein controlling the wind turbine is performed in a direction to increase the damping level,
   if the determined damping level is lower than a damping threshold and/or a vibration amplitude is greater than an amplitude threshold, and/or if temporal change, decrease, of the damping level is above or below a threshold, thereby providing derivative control.

8. The method according to claim 1, further comprising:
   using the determined damping level to predict vibration magnitude in the future;
   controlling the wind turbine based on the predicted vibration magnitude.

9. The method according to claim 1, wherein determining the damping characteristic at least partly employs system identification and/or operational modal analysis, in order to dynamically determine frequency values and damping values of plural vibration modes.

10. The method according to claim 1, wherein the vibration mode is associated with at least one vibration mode of a substructure of the wind turbine, the substructure including at least one of:
    the rotor;
    a drive train;
    at least one rotor blade;
    the tower.

11. The method according to claim 1, wherein controlling the wind turbine includes at least one of:
    changing a blade pitch angle;
    changing a setting of air flow regulating device mounted on or exposed at the blade;
    changing a rotor speed;
    changing a generator torque;
    changing yaw angle,
    changing at least one converter references of a converter coupled to a generator which is driven by the rotating rotor.

12. The method according to claim 1, including:
    requesting a damping measurement;
    exciting a wind turbine substructure;
    performing substructure strain measurements;
    performing system identification;
    determining at least one system damping level;
    changing operation state, if system damping level indicates unstable behaviour.

13. The method according to claim 1, wherein the damping level is an aeroelastic damping level.

14. The method according to claim 1, wherein, in response to the damping level going below a damping threshold, controlling the wind turbine without the wind turbine going unstable in operation.

15. An arrangement for controlling a wind turbine having a tower and a rotor at which a plurality of rotor blades are mounted, the arrangement being configured:
- to determine, in real time, a damping characteristic of at least one vibration mode related to the wind turbine; and
- to control the wind turbine based on the damping characteristic, wherein to determine the damping characteristic comprises determining a damping level calculated to depend on a relative change of a vibration magnitude related quantity with time, wherein a time course of the damping level never falls below a damping threshold where undamped vibrations occur.

16. A wind turbine, comprising:
- the arrangement according to claim 15, coupled for controlling at least one wind turbine component.

17. The arrangement according to claim 15, wherein the damping level is an aeroelastic damping level.

* * * * *